Feb. 11, 1930.  G. C. CARHART  1,746,765
MOTION TRANSMITTING MECHANISM
Filed Nov. 11, 1924  3 Sheets-Sheet 1

George C. Carhart
Inventor
By Parsons & Birdsall
Attorneys

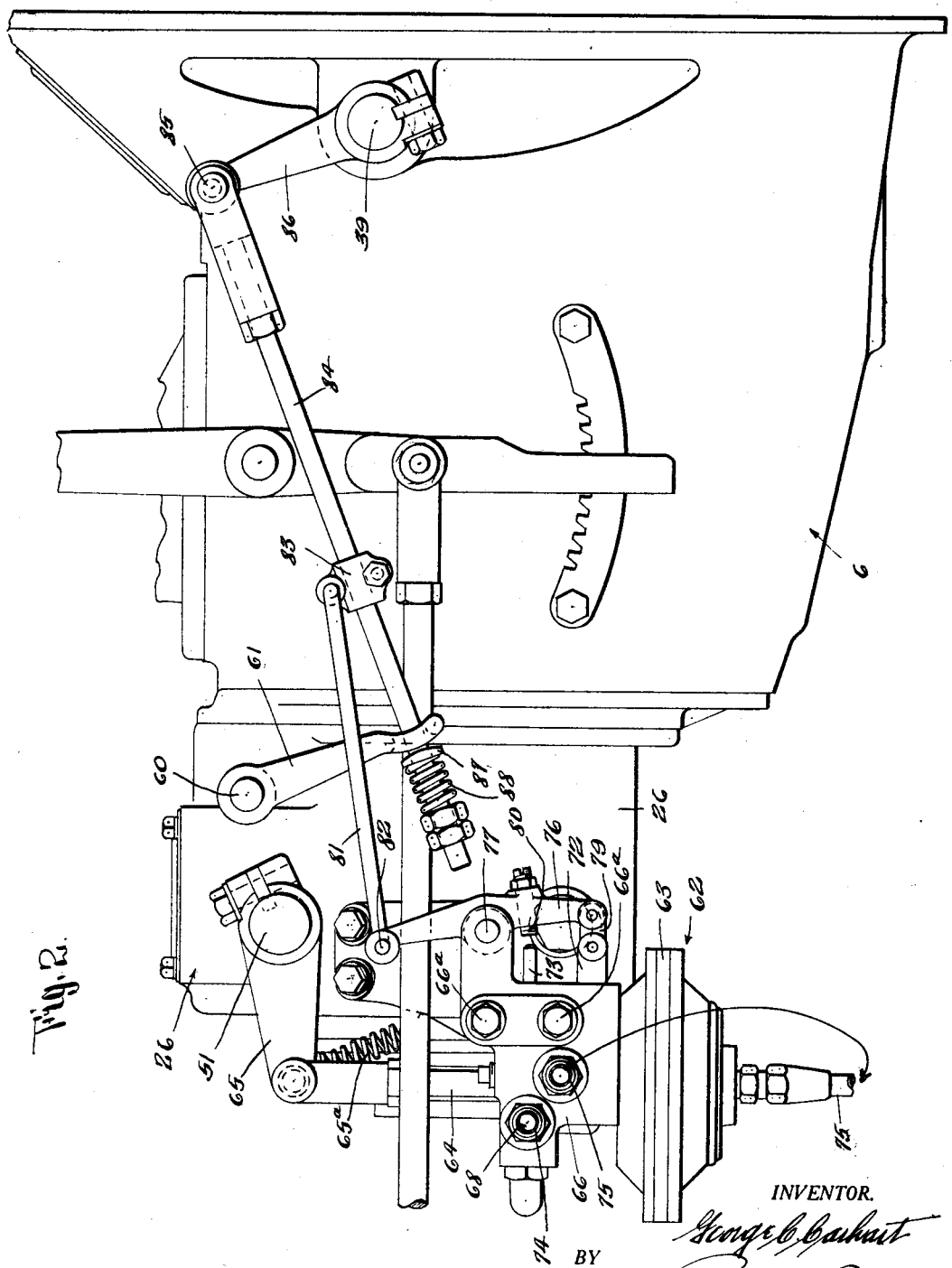

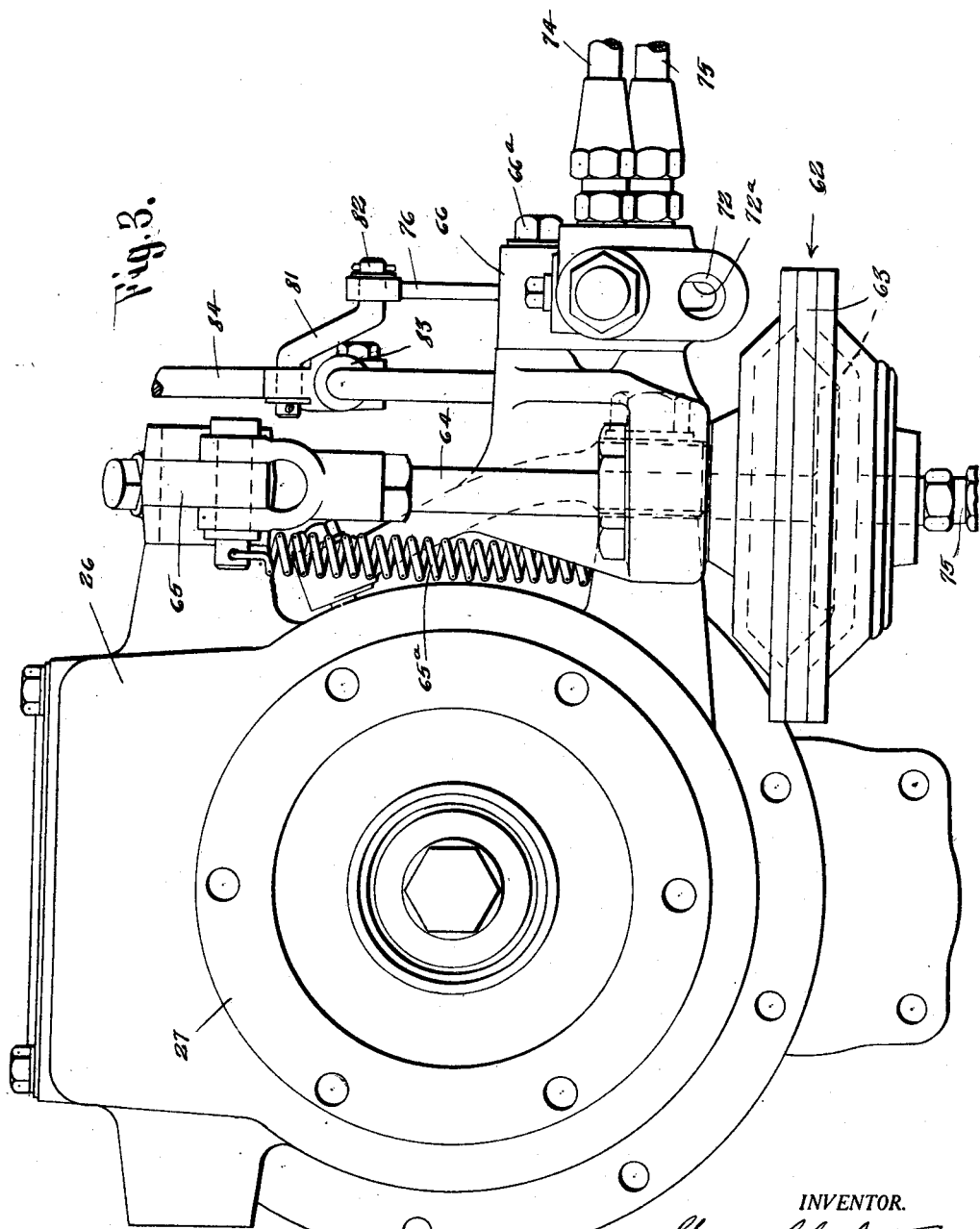

Patented Feb. 11, 1930

1,746,765

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

MOTION-TRANSMITTING MECHANISM

Application filed November 11, 1924. Serial No. 749,264.

This invention relates to motion transmitting mechanisms such as are used in motor vehicles to transmit the power of the engine to the driving axle and including a change speed gearing having an auxiliary clutch at its rear end for disconnecting the transmission gearing from the propeller shaft preliminary to speed changing operations.

The invention has for its object a particularly simple and efficient power means for operating or controlling the operation of the rear or auxiliary clutch which power means is controlled by some operator-operated member actuated by the driver of the vehicle during the process of speed changing or gear shifting operations as by the operation of the main clutch pedal.

The invention consists in the novel features and in the combinations and constructions hereinafter set forth and claimed.

In describing this invention, reference is had to the accompanying drawings in which like characters designate corresponding parts in all of the views.

Figure 2 is a side elevation thereof illustrating the operating means for the rear clutch and the connections between the operating means for the main clutch and the rear clutch.

Figure 3 is a rear elevation of parts seen in Figure 2.

Figure 1:
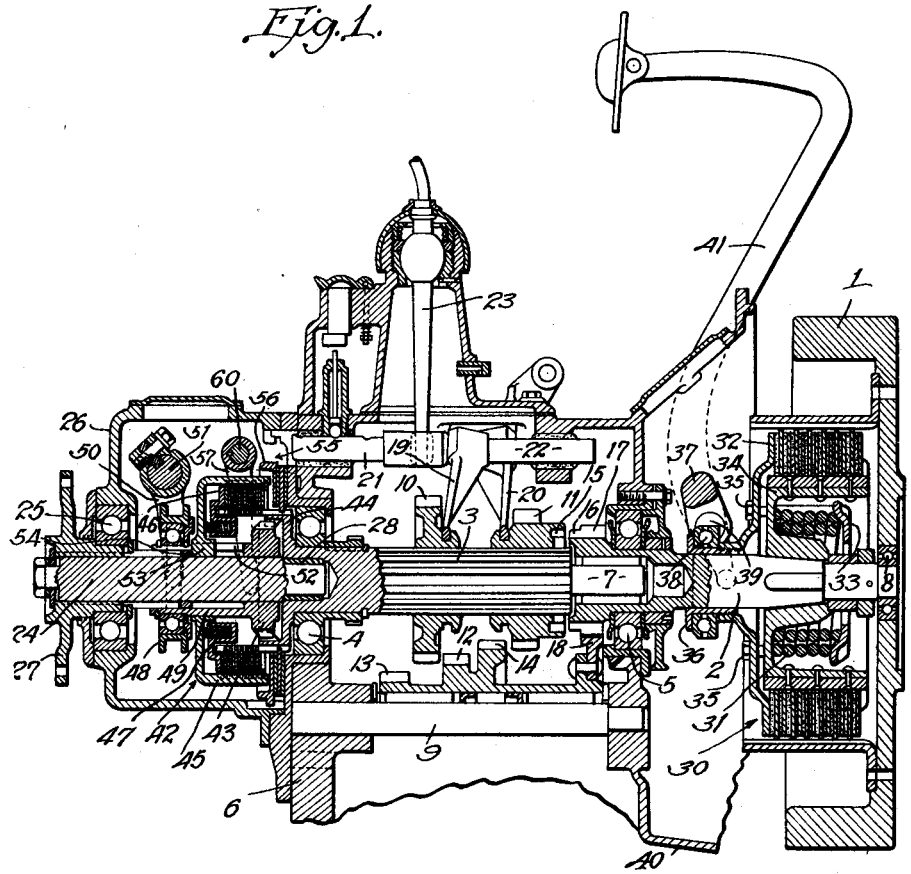
Figure 1 is a longitudinal sectional view of this transmission mechanism.
Figure 4:
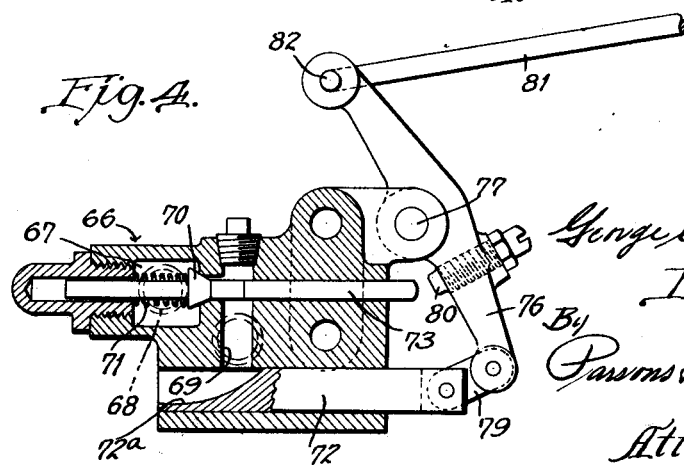
Figure 4 is a sectional view through the valve casing of the power means.

Heretofore an auxiliary or rear clutch interposed between the transmission gearing and the propeller shaft to disconnect the transmission gearing from the torque of the propeller shaft preliminary to gear shifting in order to facilitate easy shifting, has been operated by connections from the main clutch pedal or by connections from the shifting lever so that when the shifting takes place the transmission gearing is disconnected at its front end from the engine and at its rear end from the propeller shaft. When the main clutch or the gear shifting lever is operated by the operator, the operation of the rear clutch so operated by the shifting lever or the main clutch pedal, requires additional force on the part of the operator or driver on the clutch pedal or the gear shifting lever and such operation or the exercise of such additional force is more or less objectionable as it requires the driver to press harder on the clutch pedal or on the gear shifting lever. By using a supplemental source of power which is controlled only by the clutch pedal or the gear shifting lever without requiring additional effort on the part of the driver practically no additional work is required of the operator in operating the clutch pedal or the shifting lever, and hence a substantial and powerful long life, noiseless friction clutch can be employed between the propeller shaft and the transmission gearing similar to that between the engine and the transmission gearing.

Also a relatively large rear clutch or a friction clutch of comparatively high capacity can be used as the force required to operate it is not applied by, but is merely controlled by, the operator.

Any form of positive clutch is objectionable as the positive clutch develops more or less noise and hence a friction clutch of maximum capacity is not only noiseless but on account of its being power operated, is not objectionable as it does not throw additional work onto the operator or driver of the vehicle.

In the illustrated embodiment of my invention, I have illustrated the power means which operates the rear clutch as controlled by the main clutch pedal.

This motion transmitting mechanism comprises generally a driver as the engine shaft or the fly wheel thereon, a transmission gearing including generally driving and driven shafts mounted in a suitable casing or box, speed changing mechanism between the shafts and means for operating said mechanism including an element which is operated during each speed changing operation, a driven shaft extension, a main clutch between the driver and the driving shaft of the transmission gearing and an element for operating such main clutch, an auxiliary or rear clutch between the driven shaft and the extension, power means for operating the rear clutch, a member for controlling the power means and connections between one of the operating elements actuated by the driver, preliminary to gear shifting operations and the control member for the power means whereby the power means shifts the rear clutch but is controlled by a part actuated by the driver but requiring no additional effort on the part of the driver.

1 designates the driver or fly wheel of an engine.

2 the driving shaft of the transmission gearing and 3 the driven shaft, these shafts being arranged in axial alinement and journalled in suitable bearings 4, 5 in the front and rear walls of the transmission gear casing or box 6, the driven shaft 3 usually having a pilot bearing at 7 in the inner end of the driving shaft 2. The driving shaft 2 is also arranged in axial alinement with the driver 1 and has a pilot bearing 8 therein. The transmission gearing also includes usually a counter shaft 9. The transmission gearing may be of any suitable form, size and construction and that here illustrated is of the sliding gear type and includes shiftable members or gears 10 and 11 slidably mounted upon the driven shaft 3 and rotatable therewith. The gear 10 is slidable in one direction to mesh with the gear 12 on the counter shaft to produce low speed forward and in the other direction into mesh with an idler, not shown, which meshes with the gear 13 on the counter shaft 9 to produce reverse motion.

The gear 11 is shiftable in one direction into mesh with the gear 14 on the counter shaft to produce second speed forward and in the other direction to engage a clutch face 15 thereon with a clutch face 16 formed on a gear 17 on the driving shaft 2 to produce direct drive or high speed. The gear 17 permanently meshes with the gear 18 on the counter shaft to drive the gears on the counter shaft. The gear 17 is usually formed integral with the drive shaft 2, that is, it is a stem gear.

The gears 10 and 11 are shifted by forks 19 and 20 mounted on shifter rods 21 and 22 slidable in suitable guides in the casing and these rods are operated by selecting and shifting lever 23 of any well known construction.

24 is the extension of the driven shaft 3, this extension being journalled in a suitable bearing 25 in the rear wall of the casing 26 which is secured in any suitable manner to the rear wall of the transmission case or box 6. This extension 24 is coupled to the propeller shaft through a universal joint, one section of which is shown at 27. The extension 24 is usually journalled at its front end in a pilot bearing at 28 in the rear end of the driven shaft 3 of the transmission gear.

30 designates the main clutch between the driver or fly wheel 1 and the driving shaft 2 of the transmission gearing. This clutch may be of any suitable form, size and construction and is here shown as of the multiple disk type. The disks are normally compressed or engaged by a main spring 31 acting on a shiftable member or pressure plate 32. The spring 31 as here shown thrusts against an abutment 33 at one end and against the head of an inner drum 34 to which one set of disks are interlocked. This abutment 33 is connected to the shiftable member or pressure plate 32 by pull rods or tie bolts 35. The pressure plate 32 is connected to a hub or throwout collar 36 slidable axially on the shaft 2 and this throw out collar is operated to release the clutch against the action of the spring 31 by a fork or a yoke 37 thrusting against the throwout bearing 38 on the collar 36. The fork or yoke 37 is mounted on a suitable rock shaft 39 journalled in the housing 40 of the clutch and having a pedal or lever 41 at its outer end. Depression of the pedal obviously operates to thrust the throw out collar rearwardly and release the main clutch and when the pedal is released, the clutch will be re-engaged by the spring 31. The construction and operation of the clutch forms no part of this invention.

42 designates the rear or auxiliary clutch between the driven shaft 3 of the transmission gearing and the extension 24. The clutch here shown is a double clutch, one part of which has a positive engagement and the other a frictional engagement. As here illustrated, the positive clutch includes a toothed head 43 slidably mounted on the extension 24 to shift axially thereof out of and into engagement with internal teeth on a drum 44 mounted on and here shown as formed integral with the shaft 3 at the rear end thereof, that is, within the casing 26; and the frictional portion of the clutch comprises sets of interleaved disks, one set being slidably interlocked with the periphery of the drum 44 and the other set with the internal face of an outer drum 45 rotatable with the extension 24. The friction portion of the double clutch also includes a pressure ring or plate 46 arranged to compress the disks and the ring 46 is thrust into its engaging position by a series of springs 47 interposed between the head of the drum 45 and the pressure plate 46. The plate 46 is provided with suitable sockets for receiving the springs. A portion of the pressure ring or plate 46 is here shown, as the ends of the sockets for the springs 47, arranged to be engaged by the positive section or head 43 after the same has been shifted out of engagement with the internal teeth of the drum 44.

The positive clutch section 43 is shifted by means of a throw out collar 48 mounted on a sleeve 49 splined to the extension 24 secured to and preferably integral with the section 43, and the throw out collar is operated by a fork lever or yoke 50 mounted on a rock shaft 51 journalled in the case 26 and extending to the outside thereof. The hub of the outer drum 45 surrounds this sleeve 49 and the sleeve 49 is formed with one or more slots 52 through which a key portion as 53 on the hub of the drum 45 extends into one or more of the splines in the extension 24 so that the section 43 is keyed to the shaft to shift lengthwise thereof and the drum 45 is keyed to the shaft but not shiftable lengthwise thereof. Shifting of the drum 45 is prevented by a stop shoulder 54. The construction of this clutch per se forms no part of this invention.

In addition to the rear clutch, I have also shown a brake mechanism 55 for stopping or retarding the rotation of the shafts and gears of the transmission gearing when the main clutch and the rear clutch are disengaged. The brake here shown comprises sets of interleaved disks, one set of which is interlocked with the drum 44 rotatable with the driven shaft 3 of the transmission gearing, and the other set of which is interlocked with the casing 26. These brake disks are pressed together by a pressure ring 56 operated by a yoke or fork 57 mounted on a rock shaft 60 journalled in the case 26 and extending to the outside thereof and having an arm 61 at its outer end. This brake mechanism in itself forms no part of this application, but forms the subject matter of another application.

The rear clutch 42 is operated by power means controlled by the operating means for the main clutch and such power means and its control constitute the subject matter of this application.

The power means here illustrated is pressure operated by a motor which is actuated by a motive fluid as compressed air, and comprises a compression chamber a motion transmission part operated by the pressure in said chamber to operate the shifting means for the rear clutch that is, to operate the shaft 51 against the action of the springs 47, means for controlling the flow of pressure to and from the pressure chamber and connections between the last mentioned means and the operating means for the main clutch.

62 designates the compression chamber, this chamber being here shown as composed of opposing sections and a diaphragm 63 between them.

64 is a motion transmitting member in the form of a rod having a head at one end resting on the diaphragm 63. This rod is connected at its other end to an arm 65 mounted on the rock shaft 51. A returning spring 65ª is preferably connected to said arm 65.

The means for controlling the flow of pressure into the chamber 62 to actuate the diaphragm comprises a valve casing 66 mounted on one side of the casing 26 and having a valve chamber 67, an intake port 68 communicating with the valve chamber, an outlet port leading from the chamber and connected to the pressure chamber 62 and also to an exhaust port 69. The valve casing is attached to the casing 26 as by screws 66ª.

70 is the control valve in the chamber 67 and normally pressed by a spring 71 toward its seat to cut off the flow from the valve chamber 67 to the pressure chamber 62 and to the exhaust port 69. The exhaust port is opened and closed by a suitable valve 72. The intake and exhaust valves are preferably movable in parallel passages. The intake valve is opened by a rod 73 pressing against the end of the stem of the control valve, this rod 73 being parallel to the exhaust valve stem 72.

The intake port 68 is connected by a suitable pipe 74 to a source of supply of compressed air or other motive fluid and the outlet port is connected by a suitable pipe 75 to the diaphragm chamber 62.

The exhaust valve 72 is formed with a full portion arranged to cover the exhaust port 69 and with an exhaust passage 72ª arranged to come into alinement with the exhaust port 69 when the control valve 70 is closed. These intake and exhaust valves 70, 72 as here shown are operated by a single member as a lever 76 pivoted at 77 between its ends to the valve casing and having one arm connected as by a link 79 to the exhaust valve 72 and also having such arm provided with an adjustable shoulder as 80 for pushing against the end of the control valve rod 73. This shoulder 80 is normally spaced apart from the end of the rod 73 so as not to open the intake valve until after the exhaust valve 72 has been moved far enough to cover or close the exhaust port, and to permit the intake valve to close before the exhaust port is opened by bringing the passage 72ª into registration with the exhaust port 69.

The other arm of the lever 76 is connected to the operating means for the main clutch through suitable connections as a link 81 connected at 82 to the lever 76 and at 83 to a link 84 pivoted at 85 to a rock arm 86 on the shaft 39 on which the throw out yoke of the main clutch and the main clutch pedal 41 are mounted.

As the main clutch pedal 41 is depressed to throw out the main clutch, the motion thereof is transmitted through the link 84 and link 81 to the lever 76 to first actuate the exhaust valve 72 to close the exhaust port 69 and take up the lost motion between the shoulder 80 and intake valve rod 73 and then open the intake valve to permit the air to enter the diaphragm chamber and actuate the rod 64 to disengage the rear clutch 42. When the main clutch is re-engaged by releasing the foot pressure on the pedal 41, the intake valve first closes and then the exhaust valve opens to permit the air to exhaust from the pressure side of the diaphragm through the pipe 75 and exhaust port 69.

The rod 84 is also connected to the brake 55 to apply the same and stop the rotation of the transmission gearing when the main clutch and the auxiliary or rear clutch are disengaged, and as here shown this rod is provided with a shoulder preferably a spring pressed shoulder 87 thrusting against the rear side of the rock arm 61 on the operating shaft 60 for the brake 55 so that upon the depression of the main clutch pedal, the friction brake will be yieldingly applied through its spring 88.

In transmission mechanisms, having front and rear clutches, oftentimes the clutch pedal requires considerable effort to operate it to disengage the clutch sections. By my power means for operating the rear clutch, which power means is controlled by the main clutch pedal, the releasing of the clutch is rendered particularly easy. This power operated clutch is particularly advantageous in vehicles in which the normal load and hence the size or capacity of the rear clutch is relatively great, so that the operation of such clutch carrying a comparatively heavy load would be arduous if manually operated or operator-operated.

By my power means, all heavy work due to the operation of this rear clutch is eliminated and at the same time, the operation of the rear clutch is controlled by the clutch pedal.

What I claim is:

1. In a transmission mechanism for motor vehicles, the combination with a change speed gearing, front clutch and operator operated means for the front clutch, and a normally engaged rear clutch operable to release the gearing from the propeller shaft of the vehicle, of motor means for operating the rear clutch, means for controlling the application of power to the motor means and connections between the operating means for the front clutch and the means for controlling the application of power to the motor means for operating the rear clutch.

2. A transmission mechanism for motor vehicles, the combination with a change speed gearing, a front clutch and a rear clutch, operator operated throwout means for the front clutch, and the rear clutch being operable to release the gearing from the propeller shaft of the vehicle, motor means and a shifter operated thereby for disengaging the rear clutch and means for controlling the application of power to the motor means, the motor means and the shifter being normally ineffective whereby the rear clutch is normally engaged, and connections between the operating means for the front clutch and the controlling means for the motor means, for controlling the operation of the power member.

3. In a transmission mechanism for motor vehicles, the combination with a change speed gearing, an operator operated front clutch and a normally engaged rear clutch operable to release the gearing from the propeller shaft of the vehicle, power mechanism for throwing out the rear clutch comprising a pressure chamber, a motion transmitting member arranged to be actuated by the pressure in the chamber, valve means for controlling the flow of fluid to and from the chamber, and connections between the operating means for the front clutch and said valve means.

In testimony whereof, I have hereunto signed my name, at Syracuse, in the county of Onondaga, and in the State of New York, this 27th day of October, 1924.

GEORGE C. CARHART.